US012266350B1

(12) United States Patent
Ganju et al.

(10) Patent No.: US 12,266,350 B1
(45) Date of Patent: Apr. 1, 2025

(54) PRONUNCIATION FEATURES FOR LANGUAGE MODELS

(71) Applicant: Nvidia Corporation, Santa Clara, CA (US)

(72) Inventors: Siddha Ganju, Santa Clara, CA (US); Ruthie Lyle, Durham, NC (US); Steven Dalton, Cary, NC (US)

(73) Assignee: Nvidia Corporation, Santa Clara, CA (US)

( * ) Notice: Subject to any disclaimer, the term of this patent is extended or adjusted under 35 U.S.C. 154(b) by 400 days.

(21) Appl. No.: 17/583,812

(22) Filed: Jan. 25, 2022

Related U.S. Application Data

(60) Provisional application No. 63/272,952, filed on Oct. 28, 2021, provisional application No. 63/181,934, filed on Apr. 29, 2021.

(51) Int. Cl.
*G10L 15/16* (2006.01)
*G10L 13/08* (2013.01)
*G10L 15/02* (2006.01)

(52) U.S. Cl.
CPC .............. *G10L 15/16* (2013.01); *G10L 13/08* (2013.01); *G10L 15/02* (2013.01); *G10L 2015/025* (2013.01)

(58) Field of Classification Search
USPC ..................................... 704/1–504, 232, 231
See application file for complete search history.

(56) References Cited

U.S. PATENT DOCUMENTS

| 10,923,111 | B1* | 2/2021 | Fan | G10L 15/16 |
| 11,928,764 | B2* | 3/2024 | Wang | G06T 13/20 |
| 2002/0138265 | A1* | 9/2002 | Stevens | G10L 15/22 |
| | | | | 704/E15.04 |
| 2010/0246837 | A1* | 9/2010 | Krause | G10L 13/00 |
| | | | | 381/58 |
| 2010/0299148 | A1* | 11/2010 | Krause | G10L 25/69 |
| | | | | 704/E15.04 |
| 2012/0069131 | A1* | 3/2012 | Abelow | G06Q 30/0601 |
| | | | | 345/589 |
| 2017/0270919 | A1* | 9/2017 | Parthasarathi | G10L 17/06 |
| 2019/0189026 | A1* | 6/2019 | Daniels | G10L 15/22 |
| 2020/0035231 | A1* | 1/2020 | Parthasarathi | G10L 25/87 |
| 2023/0142339 | A1* | 5/2023 | Getselevich | G10L 15/16 |
| | | | | 704/275 |
| 2023/0394823 | A1* | 12/2023 | Weng | B60W 60/00276 |
| 2024/0037756 | A1* | 2/2024 | Huang | G06V 10/774 |

FOREIGN PATENT DOCUMENTS

WO WO-2022047311 A1 * 3/2022 ........... A61B 5/0205

* cited by examiner

*Primary Examiner* — Marcus T Riley
(74) *Attorney, Agent, or Firm* — Hogan Lovells US LLP

(57) ABSTRACT

Systems and methods are directed toward evaluating auditory inputs against a range of tolerance to provide feedback regarding pronunciation. An auditory input may be evaluated using a trained machine learning system and evaluated for similarity against a target word. Similarity may be scored and then evaluated to determine whether the similarity falls within a range of tolerance, wherein the range of tolerance may be adjusted or modified for particular uses. A score within the range of tolerance is indicative of a word that has been pronounced such that it would be perceptible.

17 Claims, 13 Drawing Sheets

PRONUNCIATION FEATURES FOR LANGUAGE MODELS

CROSS-REFERENCE TO RELATED APPLICATIONS

This application claims priority to U.S. Provisional Application Ser. No. 63/181,934, filed Apr. 29, 2021, entitled "Integrating Language Artifacts in Text to Speech Models," and to U.S. Provisional Application Ser. No. 63/272,952, filed Oct. 28, 2021, entitled "Assisted Learning of New Languages via User Defined and Phoneme Parameterized Pronunciations," which are hereby incorporated herein in their entireties for all purposes.

BACKGROUND

Conversational artificial intelligence (AI) systems, including various speech-to-text or text-to-speech systems, receive an input from a user and then provide an associated output. For non-native speakers, it may be challenging for these systems to recognize an input, such as an auditory input, due to variations in pronunciations for certain words, phrases, or phonemes. However, while certain phonemes may be technically mispronounced, a human lister would likely be able to recognize the word or phrase attempted by the speaker. As a result, these systems may be less applicable for certain deployments, such as language learning systems. Because the systems may not recognize a non-native speaker without perfect or nearly perfect pronunciation, the user may receive insufficient feedback or no feedback at all, thereby reducing a likelihood the user will continue to learn with the system. Additionally, existing systems are often limited by only receiving input and then providing feedback regarding pronunciation, thereby neglecting other learning opportunities such as having the user practice listening or reading words or phrases to identify errors.

BRIEF DESCRIPTION OF THE DRAWINGS

Various embodiments in accordance with the present disclosure will be described with reference to the drawings, in which.

DETAILED DESCRIPTION

Figure 1:
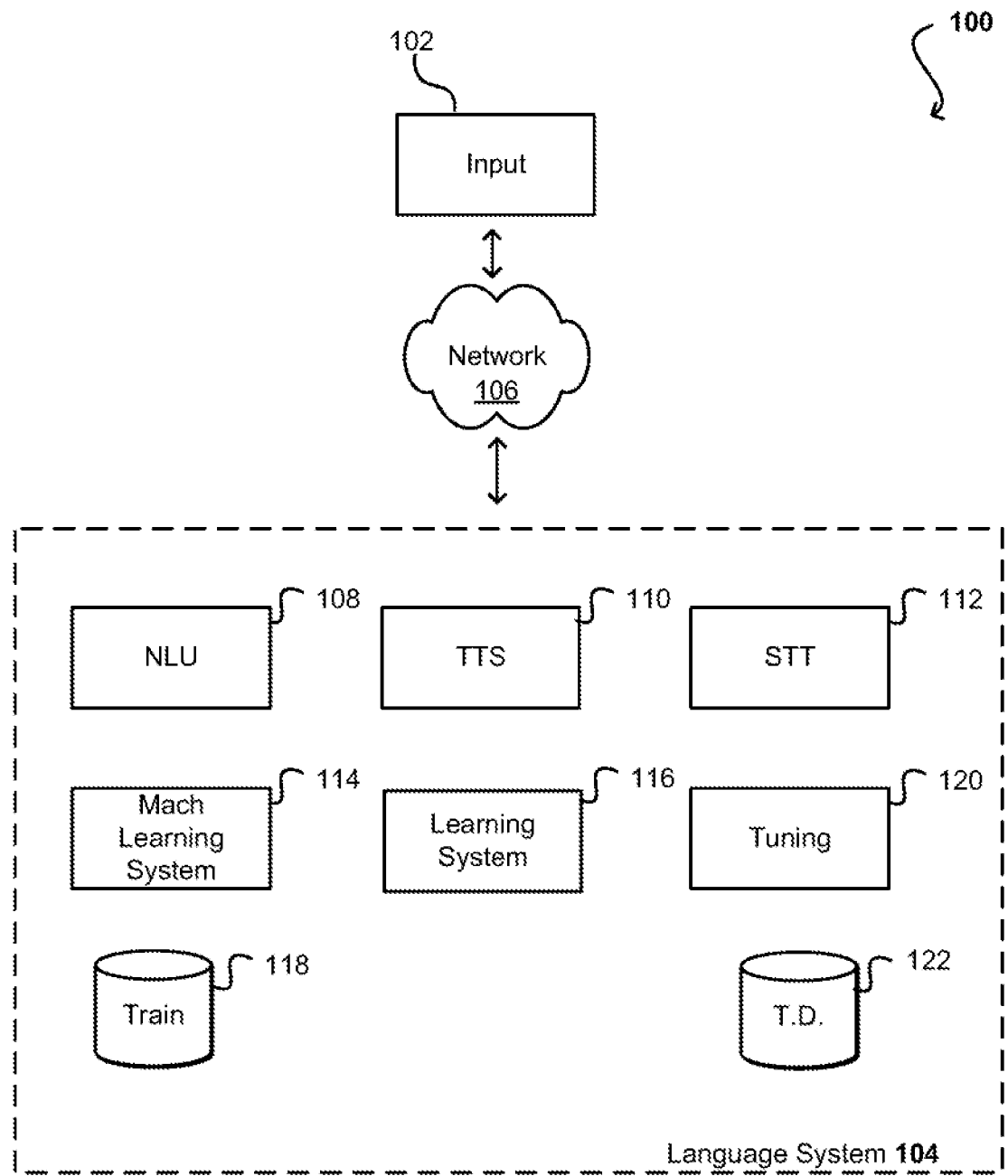
FIG. 1 illustrates an example language environment, according to at least one embodiment.

Approaches in accordance with various embodiments provide systems and methods for improvements to conversational AI systems, such as speech-to-text (STT) or text-to-speech (TTS), that institute a range of tolerance to evaluate whether a user has correctly spoken one or more words. In at least one embodiment, the range of tolerance may be based, at least in part, on information about the user, such as demographic information, and may further change dynamically, over time, as the user's skills increase or decrease. Accordingly, such a system enables a user to continuously improve their speech and listening as their skills increase, and moreover, allow the user to reach conversational proficiency faster by identifying areas where the user's pronunciation may be sufficient such that a human listener would understand. In at least one embodiment, the range of tolerance may be described as a difficulty level of a particular phoneme. Various embodiments may be deployed from a perspective of user that is speaking and/or a user that is hearing generated speech. By way of example, a user may provide an utterance to the system and then be provided with feedback regarding any mispronunciations. In another example, the user may listen to generated or recorded speech to identify potential mispronunciations. Moreover, in various embodiments, the user may be presented with written words or phrases and identify misspellings. In this manner, various embodiments may be directed toward a system that facilitates language learning for perceptibility, as opposed to a universally correct pronunciation.

In at least one embodiment, a TTS model includes one or more components to intentionally produce mispronounced and/or misspelled words. For example, a TTS model may be trained on a corpus of modified or warped words such that words or phrases generated from the TTS model are similarly warped or modified. A level of mispronunciation or misspelling may be based, at least in part, on a difficulty level, which may, in various embodiments, correspond to a skill level for an associated user. A corpus of words may be evaluated and then modified and used as training data or as parameters such that the TTS model outputs mispronounced words. A user interacting with a software interface may then identify the errors in one or more of the pronunciation and/or to a spelling associated with a presented word or phrase. In at least one embodiment, a TTS model may be trained to generate the mispronounced and/or misspelled words, which may be incorporated into a software interface where the user can interact (e.g., swipe right or left, select incorrect letters, etc.) to develop language skills. It should be appreciated that a variety of interaction techniques may be implemented in order to provide feedback to users. By way of example, when a user sees a word displayed on a screen, different letters of the word may change colors depending on a pronunciation (e.g., correct or incorrect). Furthermore, symbols or other characters may appear on different letters of a word, such as a symbol to indicate a user should place more emphasis on a letter or a symbol to illustrate a letter is "silent" with respect to pronunciation. Additionally, various embodiments may also provide further assistance with pronunciation, such as by providing words in the form of phonemes or using one or more respelling systems. Moreover, feedback provided by the system may be personalized to the user (e.g., based on user information or the like) or may generalized for an entire audience, or in at least one embodiment, may include a mixture of the these techniques. Accordingly, it should be appreciated that systems and methods of the present disclosure may incorporate a variety of different techniques in order to provide feedback to users.

Embodiments of the present disclosure are directed toward systems and methods to edit a portion of ground truth data representing an expression of text in an identified language, using at least one of a natural language processing (NLP) parser, part-of-speech tagger, or manual annotations, where editing includes at least incorporating at least one of incorrect grammar, syntax, punctuation, or spelling into the text, where such incorporation can mimic the mispronunciation or enunciation behavior common to early and non-native speakers of the identified language. According to one or more embodiments, a text to speech model uses the edited ground truth data to create an audio representation of the data. The audio representation (e.g., an audio recording produced by an artificial intelligence processing the edited ground truth data) is generated that can include one or more examples of the mispronunciation behavior common to early and non-native language speakers. It should be appreciated that the audio generated, or the appearance of the word in examples where words are shown for assistance with spelling, may be directed toward or associated with one or more geographic regions or dialects. By way of example, with respect to the English language, both "color" and "colour" may be deemed appropriate spellings, depending on the geographic location. Additionally, as another example, the pronunciation of tomato (e.g., "TUH-MAY-TOW" and "TUH-MAA-TOW") may be selected based on a desired geographic region, which may be selected by the user. In one or more embodiments, the audio representation is thereafter relayed to one or more users via a user interface, for example through a 3D Avatar, a digital twin representation, or through a conferencing platform interface. Users interact with the audio representation (e.g., via a graphical user interface or GUI) to listen to, and identify and track errors. Scoring against a user's selections and a ground truth of the expression represented in the audio representation is calculated from which a competency level can be inferred and used to adjust a level of subsequent interactions appropriately. In one or more embodiments, inferencing of the competency level can include mapped associations of performance levels with respective competency levels, so that a performance (e.g., a value representative of the user's input compared to the ground truth) can be associated with a competency level. This information could also be provided to one or more users either real-time or post engagement. Scoring could include, but is not limited to, a percentage of errors correctly identified, a number of times a user has made a similar mistake, a period of time between similar errors, and the like. Moreover, scoring may also include a weighting based on difficulty level associated with each error, and/or a genre corresponding to the expression of text. For example, certain pronunciation errors may be more common, and as a result, may be scored differently than less common errors that may be unique to the user.

Various embodiments are directed toward providing a language learning or language evaluation system that receives a range of pronunciations as a "correct" or acceptable parameter. In at least one embodiment, one or more Siamese neural networks (SNNs) are used to develop portions of a language model. SNNs identify items belonging to the same class or distinguish between different items. It should be appreciated that SNNs are provided by way of non-limiting example and various other techniques and methods may be utilized with systems and methods of the present disclosure. For example, machine learning systems that implement one or more self-supervision techniques may also be utilized. Various embodiments incorporate one or more SNNs trained on spectrograms of audio to understand the maximum pronunciation warping possible such that a word is understandable. In classical supervised learning, a human annotator would listen to each pronunciation and classify each as understandable as a certain word or not understandable. However, embodiments of the present disclosure overcome this drawback by training a range of thresholds $\tau_1, \tau_2, \tau_3, \ldots \tau_n$ as learnable parameters which define how similar or different two inputs are. The thresholds define the range of tolerance and the user can modify a threshold according to their progress, such as via a mobile device, where in at least one embodiment, a higher threshold means a large number or pronunciations are accepted as understandable. Training and testing datasets are generated by considering phonemes as the atomic units, rather than the alphabets. Phonemes vary by accents so the model can be fine-tuned based on user preferences of accents as well.

In at least one embodiment, user input is scored based on the learned distance metric between the embedded phoneme and the target utterance. During passive listening practice the user is prompted to monitor the generated output for various generated mispronounced parts of a provided sentence, the user is provided with immediate feedback regarding the ground truth correctness which provides an efficient means to train listening and comprehension skills. During active speaking practice user provided phonemes are compared with expected output and immediate feedback is provided regarding the overlap between the samples.

Various embodiments of the present disclosure may also incorporate group recommendations or group analysis based, at least in part, on demographic information of the users. For example, user data may be collected, an anonymized and/or discarded after use, in order to determine expected mistakes for certain groups of users. By way of example only, users having a certain native language may be more likely to make one or more mistakes than other users having a different native language when learning the same target language. Accordingly, various embodiments may incorporate these recommendations into either a scoring process or into a learning process to provide additional assistance or practice on common errors to enable the user to reach proficiency more quickly.

It should be appreciated that systems and methods may be incorporated while reducing the collecting or use of user personal data, such as by keeping data on a user's local device without transmission to a central server, by anonymizing user information prior to transmission, by incorporating various cryptographic techniques, by discarding user inputs (e.g., audio inputs) after analysis, and the like. Moreover, various embodiments may enable users to opt out of or opt into different levels of data collection, thereby providing the user with options regarding how their data is collected or utilized. Furthermore, federated learning can be used to perform privacy preserving learning from all users and eventually improve the global model that is available to each user. As a result, various embodiments, may enable improved training of various AI systems by collecting large scale labeled data (e.g., user input) while maintaining user privacy.

While various embodiments may discuss systems and methods with respect to language systems, such as language learning systems, embodiments are not limited to such implementations. For example, various embodiments may be incorporated into a variety of systems where a user may provide an audio input, such as a virtual assistant, chat bot, and the like. By way of example only, systems and methods may incorporate various thresholds into a smart speaker or personal assistant in order to increase a range of understanding for the speaker, among other options.

An environment 100 may be utilized with one or more language systems, as shown in FIG. 1. It should be appreciated that the environment 100 may include more or fewer components and that various components of the environment 100 may be incorporated into singular systems, but may be shown as separate modules for convenience and clarity. In this example, an input 102 is transmitted to a language system 104 via one or more networks 106. It should be appreciated that the input may be an auditory input or utterance, a text input, such as an input provided by a user, a converted text input, such as an utterance that has been evaluated and then converted to text, a sequence of text extracted from an input image or video, or the like. In at least one embodiment, the input 102 may be responsive to a question or prompt provided to a user, such as via conversational artificial intelligence (AI) system or a language model that is utilized to, in various embodiments, teach or train a user to develop language skills.

The networks 106 may be wired or wireless networks which include one or more intermediate systems, such as user devices, server components, switches, and the like. Moreover, it should be appreciated that one or more features of the language system 104 may be pre-loaded or otherwise stored on a user device such that transmission of at least a portion of data may not utilize the network 106 but may be performed locally on a device. By way of example, one or more portions may be executed on a user device for reduced latency, but may transmit or receive other information across the network 106. As noted herein, transmission across the network 106 may be limited to certain data that is authorized by the user for transmission, which may be anonymized and/or encrypted prior to transmission. Furthermore, users may have the option to opt out of such transmissions. Additionally, in various embodiments, certain data may be blocked or restricted from transmission, such as demographic or personal information, voice recordings, and the like.

In this example, the language system 104 includes a natural language understanding (NLU) system 108, a TTS module 110, and a STT module 112. As will be appreciated, the NLU system 108 may be utilized with one or more conversational AI systems to enable humans to interact naturally with devices. The NLU system 106 may be utilized to receive, process, and evaluate different portions of the input 102. For example, the input 102 may be preprocessed, which may include tokenization, lemmatization, stemming, and other processes. Additionally, the NLU system 108 may include one or more deep learning models, such as a BERT model, to enable features such as entity recognition, intent recognition, sentiment analysis, and others. Furthermore, the NLU system 106 may enable conversion of linguistic units of the input 102 into phonemes, which may then be assembled together, such as by using one or more prosody models.

In at least one embodiment, TTS model 110 may take a text response generated by the NLU system 106 and change it to natural-sounding speech. It should be appreciated that, in various embodiments, the prosody model may be part of the TTS model 110. The output from the NLU system 106 may undergo various processes associated with the TTS model 110, such as linguistic analysis, synthesis, and the like. Additionally, parts of speech may be tagged. In various embodiments, output may be further analyzed for refining pronunciations, calculating the duration of words, deciphering the prosodic structure of utterance, and understanding grammatical information. Additionally, text may be converted to mel-spectograms for output to a vocoder to generate natural sounding speech. As noted above, it should be appreciated that, in various embodiments, the vocoder may be incorporated into the TTS model 110. Accordingly, an audio output is generated that sounds like human speech.

In at least one embodiment, STT model 112 may take a verbal input, such as an utterance, and then resample the raw audio signals using one or more signal processing techniques, such as standardization, windowing, and/or conversion, among other options. This processing may enable spectrogram transformation to provide a machine-understandable version of the utterance. One or more acoustic models may be associated with the STT model 112 to consider a spectrogram as an input and produce probability scores for all different vocabulary tokens over different time steps. In various embodiments, one or more language models may then be utilized to add contextual representation so that a decoder may output the speech in a textual format.

In at least one embodiment, one or more machine learning systems 114 may be utilized, at least in part, to provide an output to a user that interacts with a learning system 116, which may be a language learning system. By way of example only, the input 102 may be a user provided utterance of a word of a language that the user is attempting to learn or to improve their skills. The input 102 may be received at the NLU 108 and converted to text via the STT 112 for evaluation by, for example, the machine learning system 114 to determine whether the input 102 corresponds to a proper or expected pronunciation of a word, which may be within a range of tolerance. The learning system 116 may then provide feedback to a user to indicate a quality or score of their pronunciation.

Various embodiments may incorporate one or more SNNs associated with the machine learning systems 114. As will described, the SNNs may be used, at least in part, to generate a range of tolerance for various words that provides a range or spectrum of pronunciations where the word will be recognized. In various embodiments, an SNN refers to an artificial neural network containing two or more identical subnets, in that the subnets use the same weighting parameters and/or have the same structure (e.g., same number of layers, etc.). These networks may be used to find similarities between inputs by comparing feature vectors, for example via a similarity function. In embodiments, triplet loss is utilized with SNNs to compare a baseline input against a first input and a second input. A distance between the baseline and the first input may be minimized while a distance between the baseline and the second input may be maximized. In one or more embodiments, contrastive loss may also be utilized, where embeddings are learned such that two similar points have a low Euclidean distance, while two dissimilar points have a large Euclidean distance. Various embodiments may incorporate various loss calculations into the previously described thresholds in order to increase or decrease a threshold of for understanding.

In at least one embodiment, training data 118 may be collected to train the machine learning systems 114, where training data my include spectrograms of audio to understand a maximum pronunciation warping such that a word is still understandable (e.g., perceptible within a range). As noted above, a range of thresholds may be trained as one or more learnable parameters. The thresholds may define ranges of tolerance and may be modified, for example by a user, according to their progress with respect to language learning. For example, a tuning module 120 may utilize tuning data 122, such as a user's experience with a language, a user's background, a user's native language, and the like so that as a user progresses, the tolerances may decrease. Furthermore, for learning language that are more similar (e.g., two Slavic languages) a native speaker for a first language may have a lower tolerance (e.g., a smaller range) than a native speaker for a second, less similar language (e.g., a Germanic language and a Sinitic language), where a higher tolerance (e.g., a larger range) may be provided. It should be appreciated that, in various embodiments, tuning modules 120 and/or tuning data 122 may be locally stored on a client device that may update one or more networks that are downloaded and execute on the client device, thereby reducing a likelihood that sensitive data is transmitted over one or more networks. Furthermore, if user personal data is utilized to improve or update networks, the user may opt-in to such use and the data may further be anonymized and encrypted prior to transmission across the networks 106.

Figure 2A:
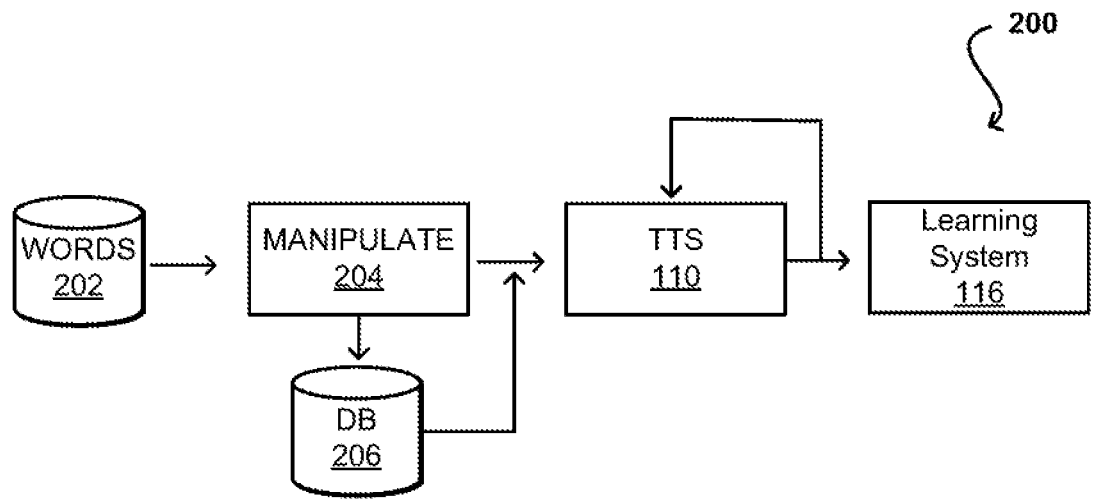
FIG. 2A illustrates an example pipeline for a language system, according to at least one embodiment.

FIG. 2A is an example pipeline 200 illustrating word manipulation in order to provide, through the learning system 116, one or more mispronounced and/or misspelled words to a user. It should be appreciated that various embodiments may include more or fewer components, and moreover, various components may be integrated within or associated with other components. Furthermore, it should be appreciated that components may operate on a user device and/or be accessible from a remote location, such as a distributed environment. In this example, a corpus of words 202 may be processed via a manipulator 204, which may modify or change portions of words in order to generate improperly pronounced and/or spelled words. The words 202 may be associated with one or more languages and be incorporated into a program, such as an executable program, that is used for language learning where a user can hear an improperly pronounced word and try to identify or otherwise indicate that the word is improperly pronounced As noted above, the "improper" pronunciation may correspond to a pronunciation that is outside of a range or exceeds a threshold, where the range or threshold may vary based on a number of factors, such as a user's skill level, a user's background, a user's preferences, and the like.

In at least one embodiment, the manipulator 204 takes an input of one or more words or phrases from the words database 202 and modifies the words to generate an output of a changed or modified word. In certain embodiments, the output may be stored within a modified word database 206 and/or may be provided to the TTS model 110. Processing and generating a list prior to use by a user may enable population of the database 206, which may then be stored locally on a user device to reduce latency. However, in various embodiments, words may be generated "on demand" responsive to a user's input to one or more applications. The manipulator 204 may perform various changes or modifications to different words in order to generate the modified words, including but not limited to, incorrect grammar, incorrect syntax, incorrect punctuation, incorrect spelling, or the like. For example, spelling of words may be warped, which when provided to the TTS model 110 will pronounce the words incorrectly. These incorrectly pronounced words may then be utilized by the learning system 116 and/or stored as ground truth information to further train one or more TTS models 110 to generate incorrectly spelled or pronounced words.

Figure 2B:
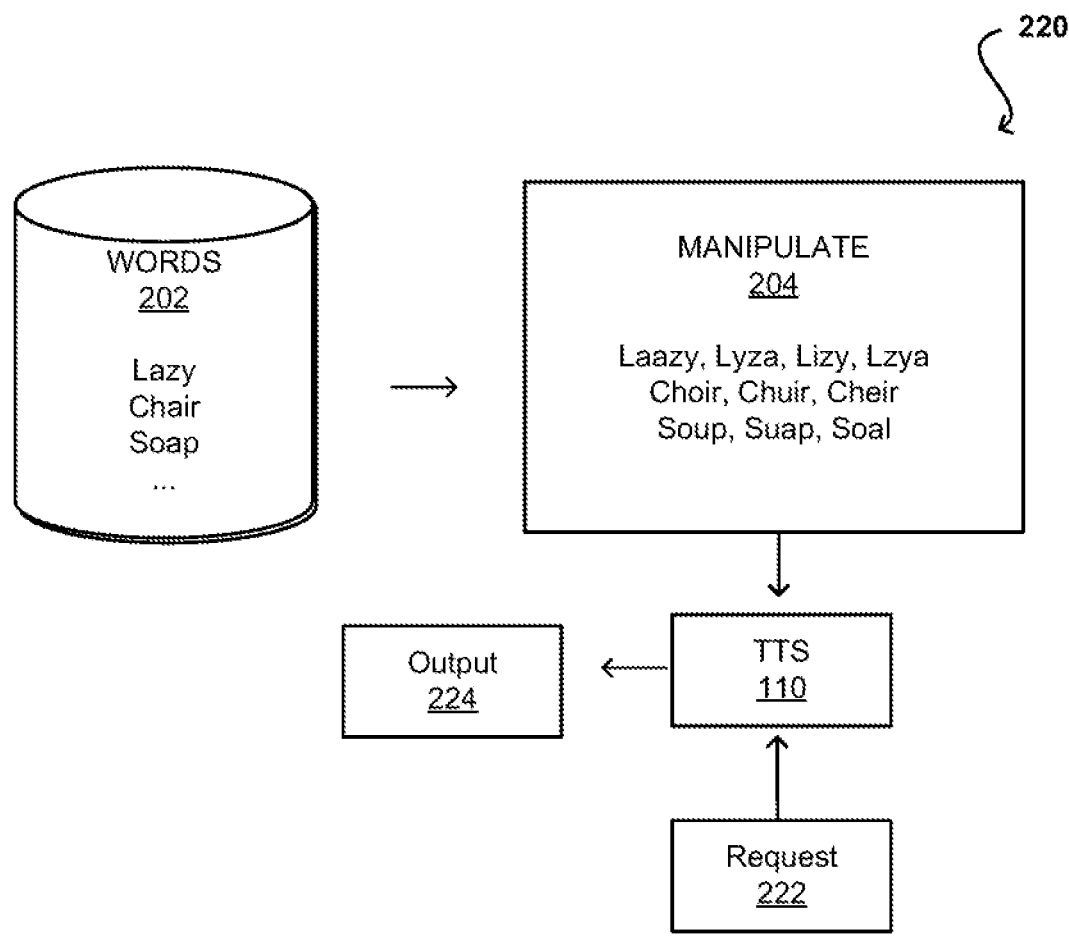
FIG. 2B illustrates an example pipeline for a text manipulation system for a language system, according to at least one embodiment.

FIG. 2B illustrates an example pipeline 220 illustrating words from the database 202 being manipulated 204 to train the TTS model 110 to generate misspelled and/or mispronounced: words responsive to a request 222. In this example, various different words may be presented in the database 202 that may be manipulated or otherwise modified by the manipulator 204. For example, "lazy" may be converted to "lazy" or "lyza," which may produce words that are mispronounced, words that sound like different words, or even to a phrase such as "lyza" which may have no known or difficult pronunciations. These modified words may be used to train the TTS model 110 such that the request 222 generates inferences that lead to outputs 224 that are mispronounced and/or misspelled words. These words may then be provided to learning systems for presentation to a user, which may enable the user to identify the mispronunciations and/or misspellings.

Figure 2C:
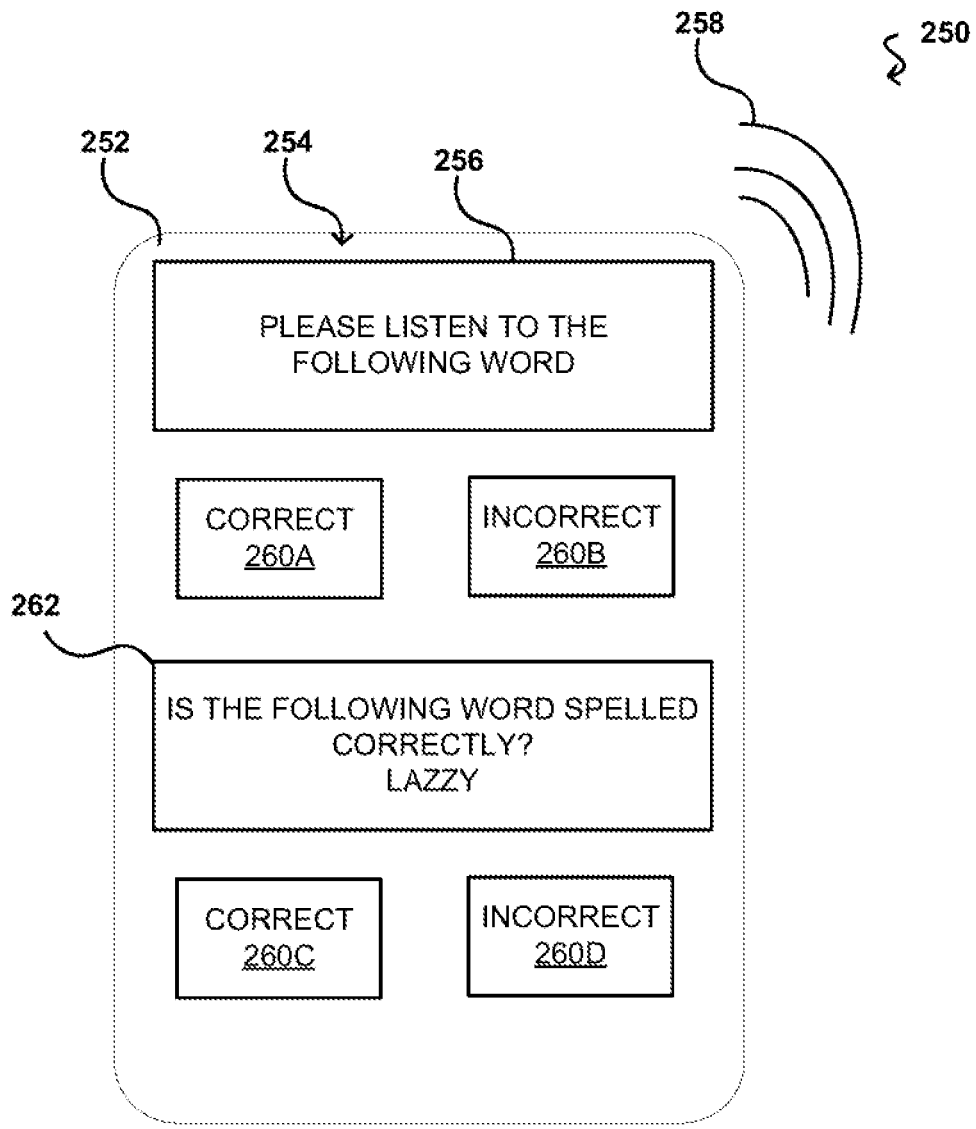
FIG. 2C illustrates an example interface for a language system, according to at least one embodiment.

FIG. 2C is an example interaction environment 250 featuring a user device 252 that may be executing an application, such as an application for language learning. For example, the learning system 116, which may be a language learning system, may include a user interface 254 that may receive one or more inputs from a user and/or provide prompts to the user. In this example, language learning may be performed by a user either identifying a mispronunciation or by identifying misspellings.

A first prompt 256 includes a message to a user to listen to an auditory sound 258, which may include a generated audio sample of a word, which may be produced by the TTS model 110 and produce a mispronounced word. The user may then interact with one or more interaction elements 260A, 260B in order to provide a response to the prompt regarding whether or not a word is pronounced correctly. As noted above, "correctly" may be within a range or threshold, where as a user's skill is increased, the threshold or range may become smaller. Furthermore, the threshold or range may be adjusted based, at least in part, on the user's personal preferences, personal background, and the like.

A second prompt 262 includes a message to a user to determine whether a word is correctly or incorrectly spelled. This word may also be generated by one or more systems, such as the TTS model 110, where the word was utilized as in put to the TTS model 110. In various embodiments, the auditory sound 258 is the same as the word within the second prompt 262. Again, the user may provide feedback via the interaction elements 260C, 260D to provide an answer to the prompt. In this manner, the user may provide feedback regarding both pronunciation and spelling for improved learning.

Figure 3A:
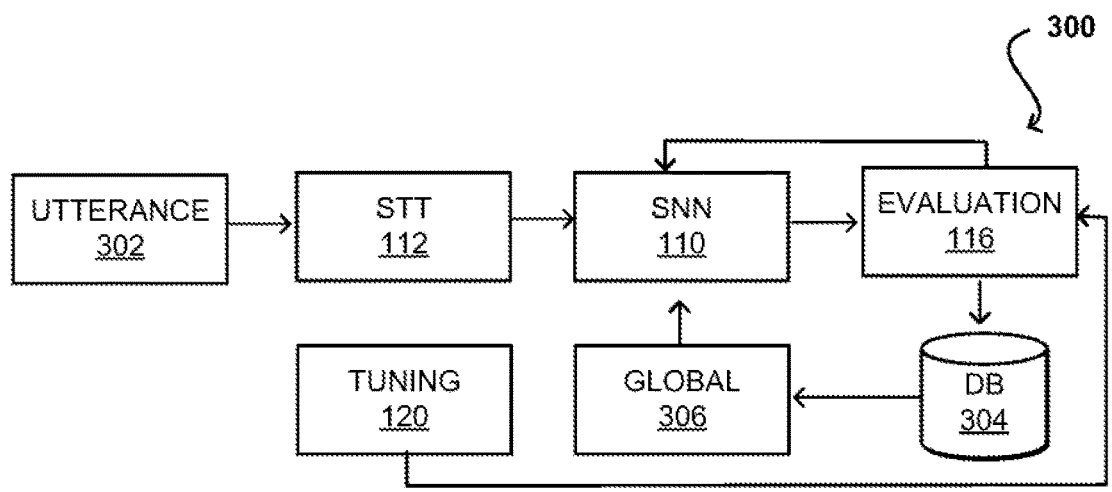
FIG. 3A illustrates an example pipeline for a language system, according to at least one embodiment.

FIG. 3A is an example pipeline 300 illustrating evaluation of an utterance 302 spoken by a user to identify whether the utterance falls within a range or threshold. In this example, the utterance 302 may be an auditory input provided by a user, such as a user interacting with a user device. However, it should be appreciated that the utterance 302 may also be stored audio files or spectrograms that are provided to the system. The SST model 112 may convert the utterance into text for processing using one or more neural networks, such as the SNN 110. As noted above, the SNN 110 may evaluate the input utterance 302 to determine whether it is similar to, or within a range of similarities to an intended word. An evaluation module 116 may be utilized to score the utterance 302 on a learned distance metric between an embedded phoneme, which may be based on the ranges and training data, and the target utterance 302. For example, the user-provided utterance 302 is compared with an expected output and feedback may be provided regarding an overlap.

The evaluation module 116 may output the results of the comparison to a results database 304, which may be used for further training of a global language network 306. The global language network 306 may then be utilized to update or otherwise refine the SNN 110.

In at least one embodiment, tuning parameters 120 are provided to the evaluation module 116 to facilitate a determination of whether or not the utterance 302 is within a threshold range. The tuning parameters 120 may be based, at least in part, on user information, such as a user's proficiency with a language, a user's background, and the like. In this manner, the thresholds or ranges may change over time, for example, as the user's skills improve. Furthermore, in at least one embodiment, thresholds or ranges may be adjusted based on provided user information, such as a user's native language. Accordingly, the user may receive feedback that provides information regarding whether their pronunciation of a word is within a threshold range of understandability, rather than determining whether or not the pronunciation is "correct" based on one or more potentially arbitrary standards. Moreover, the user may adjust this feedback based on adjustments to various (e.g., t described above), so that as the user improves their skills, they may need to provide answers closer in pronunciation than when they were first learning. Furthermore, the user may adjust the thresholds for specific areas of focus. For example, the user may have trouble with a particular pronunciation, and as a result, may increase the range for that pronunciation. As a result, improved learning opportunities are provided to users, opening up opportunities for diverse candidates with different language needs and speeds. Moreover, the user's learning opportunities can be adjusted to their particular needs, such as by adjusting thresholds at different rates or for particular words, phrases, phonemes, and the like in order to further target and facilitate learning.

Figure 3B:
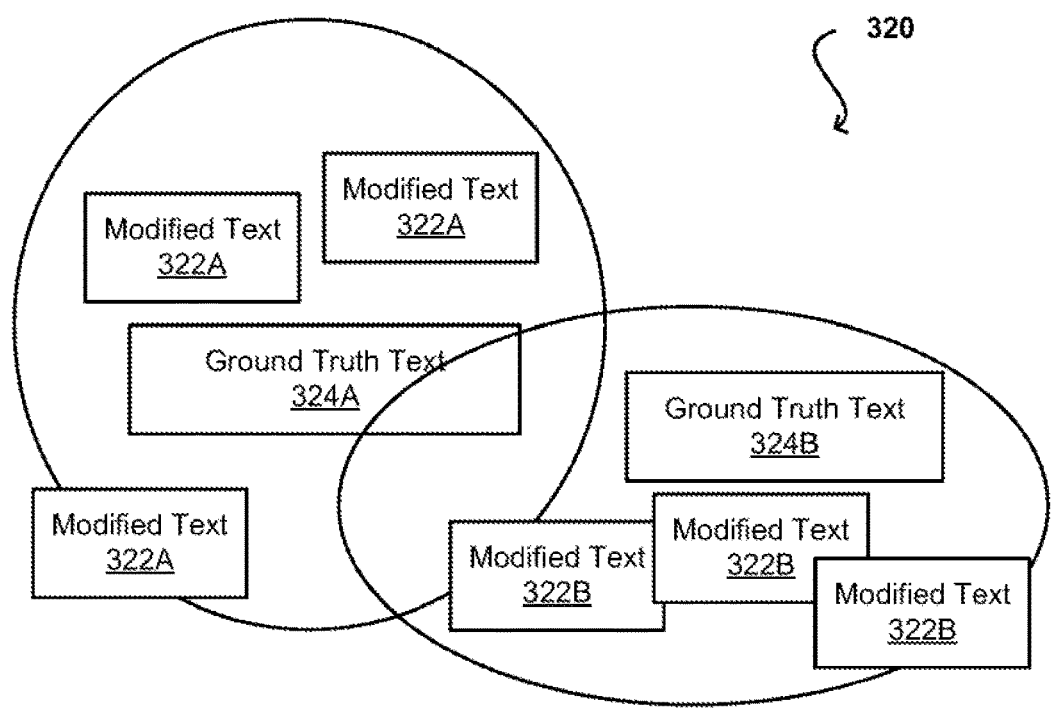
FIG. 3B illustrates an example of word clustering for identification thresholds, according to at least one embodiment.

FIG. 3B is a visualization 320 of a distance determination for various embeddings. In this example, embeddings are generated, for example via the SNN 110, such that modified text 322 is clustered with respect to ground truth text 324. In this example, a distance in vector space between the respective modified texts 322 and their associated ground truths 324 may be determined to determine a range of tolerance wherein words within a certain cluster can be identified as the ground truth text. In other words, the modified text 322 may be understandable as the ground truth text 324 without being a necessary "correct" pronunciation. In this example, an overlap is illustrated between different words, such as similar sounding ground truth words (e.g., homonyms).

Figure 3C:
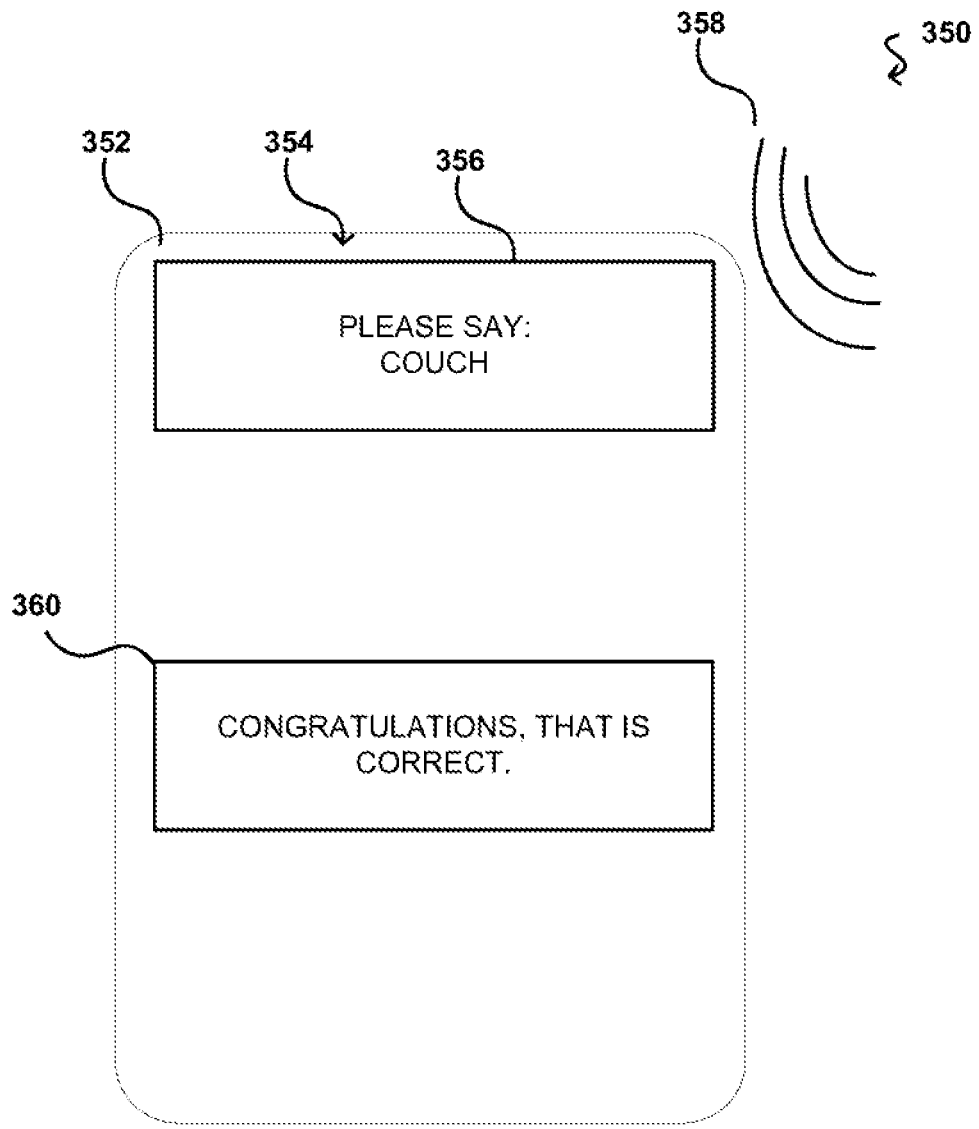
FIG. 3C illustrates an example interface for a language system, according to at least one embodiment.

FIG. 3C is an example interaction environment 350 featuring a user device 352 that may be executing an application, such as an application for language learning. For example, the learning system 116, which may be a language learning system, may include a user interface 354 that may receive one or more inputs from a user and/or provide prompts to the user. In this example, language learning may be performed by a user where the user provides an utterance corresponding to a certain word or phrase and the learning system determine whether the pronunciation of the word or phrase is within a threshold understandable range of tolerance.

As shown, a prompt 356 is provided to the user that includes instructions, such as a request to say a certain word or phrase. A user may provide an utterance 358 that is received by the user device 352, such as using a microphone, and may be processed using one or more learning systems. In various embodiments, various systems are accessible by the learning systems, whether they are stored locally on the user device 352 or not. For example, one or more SNNs may be loaded onto the user device 352, where preferences may be utilized to adjust ranges of tolerance based on various user properties. However, this stored information may remain on the device and not be provided to a global model, for example, which may receive additional information to further improve on overall model properties.

In this example, a second prompt 260 provides the user with feedback, which in this instance is an indication that the user has successfully pronounced a word. It should be appreciated that the feedback may not always be an indication of success, but may inform the user of one or more errors in pronunciation. The feedback may also include instructions or other prompts to help the user successfully perform a task, such as providing audio of proper pronunciations, identify portions of the word that were mispronounced, or other feedback.

Figure 4:
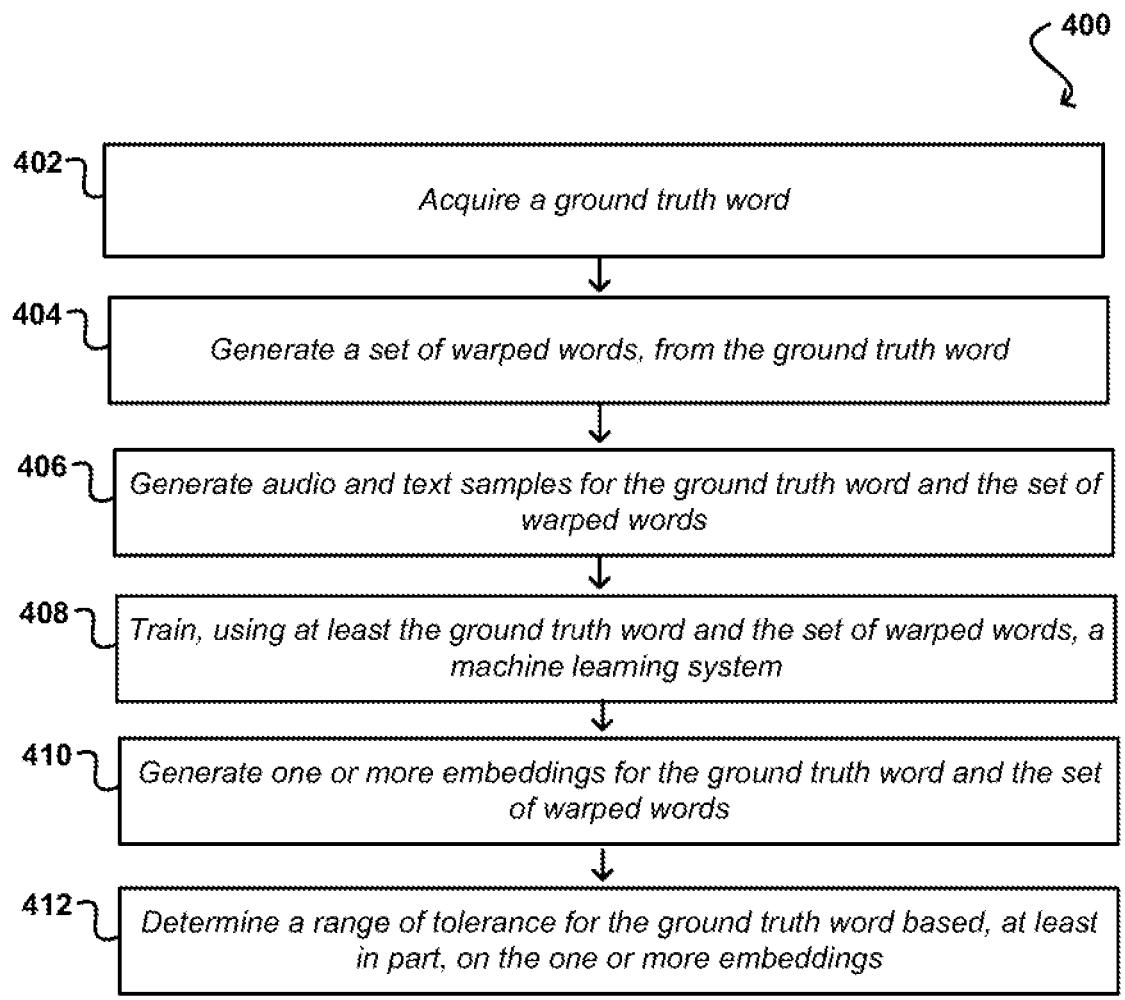
FIG. 4 illustrates an example flow chart of a process for range of tolerance determination, according to at least one embodiment.

FIG. 4 illustrates an example process 400 for determining a range of tolerance for a learning system. It should be understood that for this and other processes presented herein that there can be additional, fewer, or alternative steps performed in similar or alternative order, or at least partially in parallel, within the scope of various embodiments unless otherwise specifically stated. In this example, a ground truth word is acquired 402. The ground truth word may be pulled from a database, provided by a user, provided by a reviewer, or the like. For example, the ground truth word may be selected, by a user, from a database corresponding to a particular data set, such as words to be learned when learning a new language. In this example, a set of warped words are generated 404. Warped words may correspond to modifications or changes to the ground truth word. It should be appreciated that warping or modifying words may include adjustments to grammar, adjustments to syntax, adjustments to punctuation, adjustments to spelling. In various embodiments, warped words may be particularly selected to mimic mispronunciations or enunciation behavior common to early or non-stative speakers for a particular identified language. In various embodiments, warped words may be generated by shuffling letters, replacing letters, changing phonemes, and the like.

In one or more embodiments, audio and text samples are generated for the ground truth word and for the set of warped words 406. For example, a TTS system may be used to generate the audio samples. However, it should be appreciated that a human reviewer may say and record the audio samples. These samples may then be used to train one or more machine learning systems 408, such as an SNN. The SNN may process the samples, or any other introduced samples, to generate one or more embeddings 410. These embeddings may correspond to a distance between the ground truth and the warped words, where shorter distances may correlate to words that are closer to the ground truth than others. In at least one embodiment, ranges of tolerances are determined based, at least in part, on the embeddings 412. Accordingly, ranges of tolerance may be used to evaluate a user input of a word or phrase to determine whether the user's pronunciation is correct, in that it would be understandable to a listener.

Figure 5:
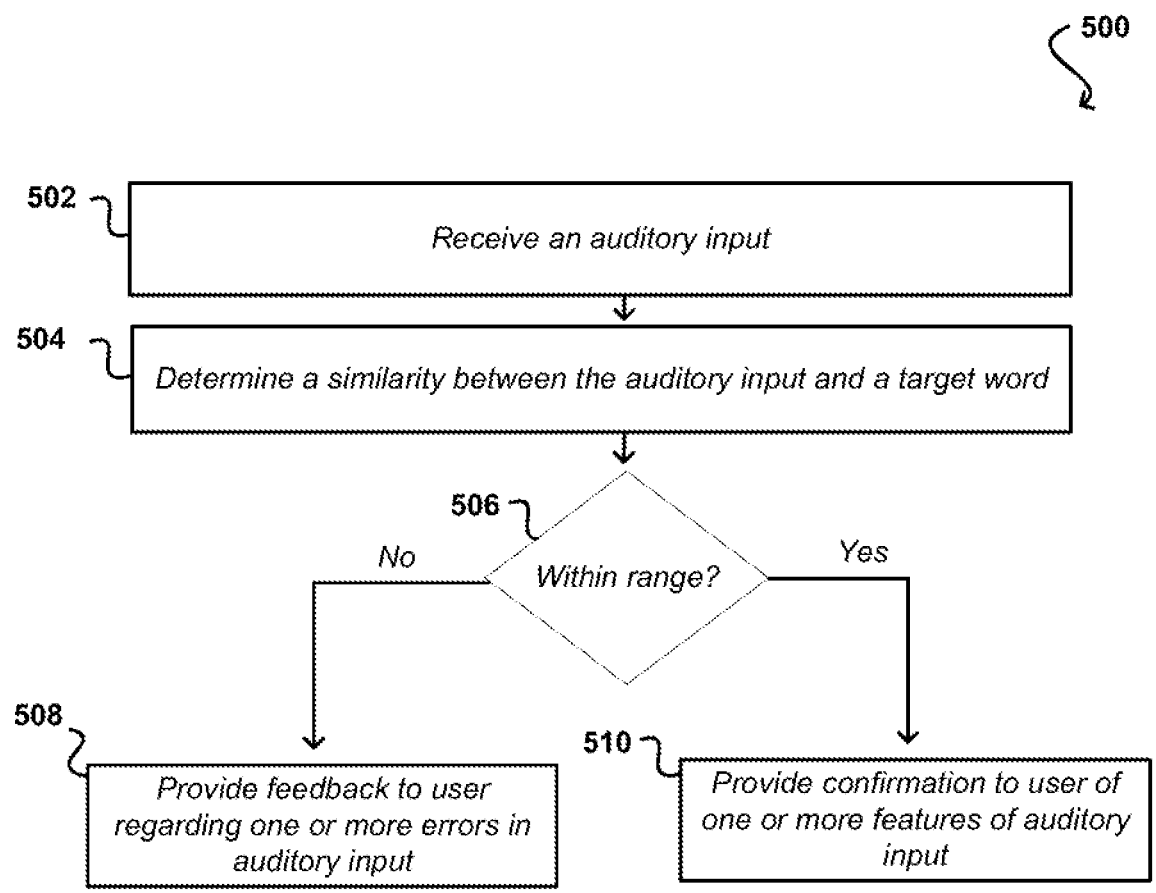
FIG. 5 illustrates an example flow chart of a process for providing user feedback in a language system, according to at least one embodiment.

FIG. 5 illustrates an example process 500 for evaluating an auditory input. In this example, an auditory input is received 502. The auditory input may be from a user that is interacting with a user device. By way of example, the user device may execute a language learning program where a user provides an auditory input of a word or phrase and their pronunciation is evaluated. In at least one embodiment, the auditory input is evaluated to determine a similarity with a target word 504. The evaluation may take place using one or more SNNs, which may have been trained using one or more methods described herein. For example, the evaluation may determine whether the pronunciation of the auditory input is within a range of tolerance 506. The range of tolerance, as noted herein, may be adjusted or change for different users. For example, as a user's skills improve, the range may decrease. Moreover, the range may be tuned using user information, such as native language.

As shown, if the auditory input is outside of the range, then feedback may be provided to the user 508. The feedback may include, for example, an indication of an incorrect pronunciation or may provide specific parts of words or phrases where errors occurred. If the auditory input is within the range, confirmation of success may be provided 510. In this manner, learning can be improved so that users are receiving reinforcement and real or near-real time feedback. Moreover, by adjusting ranges, users may be provided with increased challenges to further develop skills.

In various embodiments, the user may continue to utilize the system and provide another auditory input. In at least one embodiment, the following words or phrases provided to the user may be based, at least in part, on the user's performance up to that point. For example, if the user has correctly pronounced a number of words, the user may be presented with more challenging words. However, if the user has incorrectly pronounced a number of words, the user may be presented with easier words. It should be appreciated that "more challenging" or "easier" words may be calculated based on a number of factors, such as number of syllables, length of the word, user demographics, and the like. For example, a non-native speaker from a certain region may have more difficultly pronouncing certain letters or phonemes than others. Accordingly, easier words would not include those harder to pronounce letters or phonemes. In this manner, the user may receive encouragement to continue learning, even after a number of incorrect responses. Furthermore, while embodiments may be described with respect to auditory inputs, it should be appreciated that a similar calculation of follow on words may be utilized in embodiments where the user is recognizing misspellings or recognizing mispronounced words or phrases.

Various embodiments may also utilize different levels or learning, where the user can select various "intense" study sessions where a particular focus may be on the user's weak areas in the language. For example, if the user consistently mispronounces a certain word or phrase, similar sound words may be repeatedly shown in an "intense" session in order to provide targeted practice. Additionally, when using modes that provide the user with pronunciations or spellings, the user may be provided with words that have similar spellings but different pronunciations. In this manner, the user may tailor their experience not only on their skill level, but also on how they choose to learn.

Figure 6:
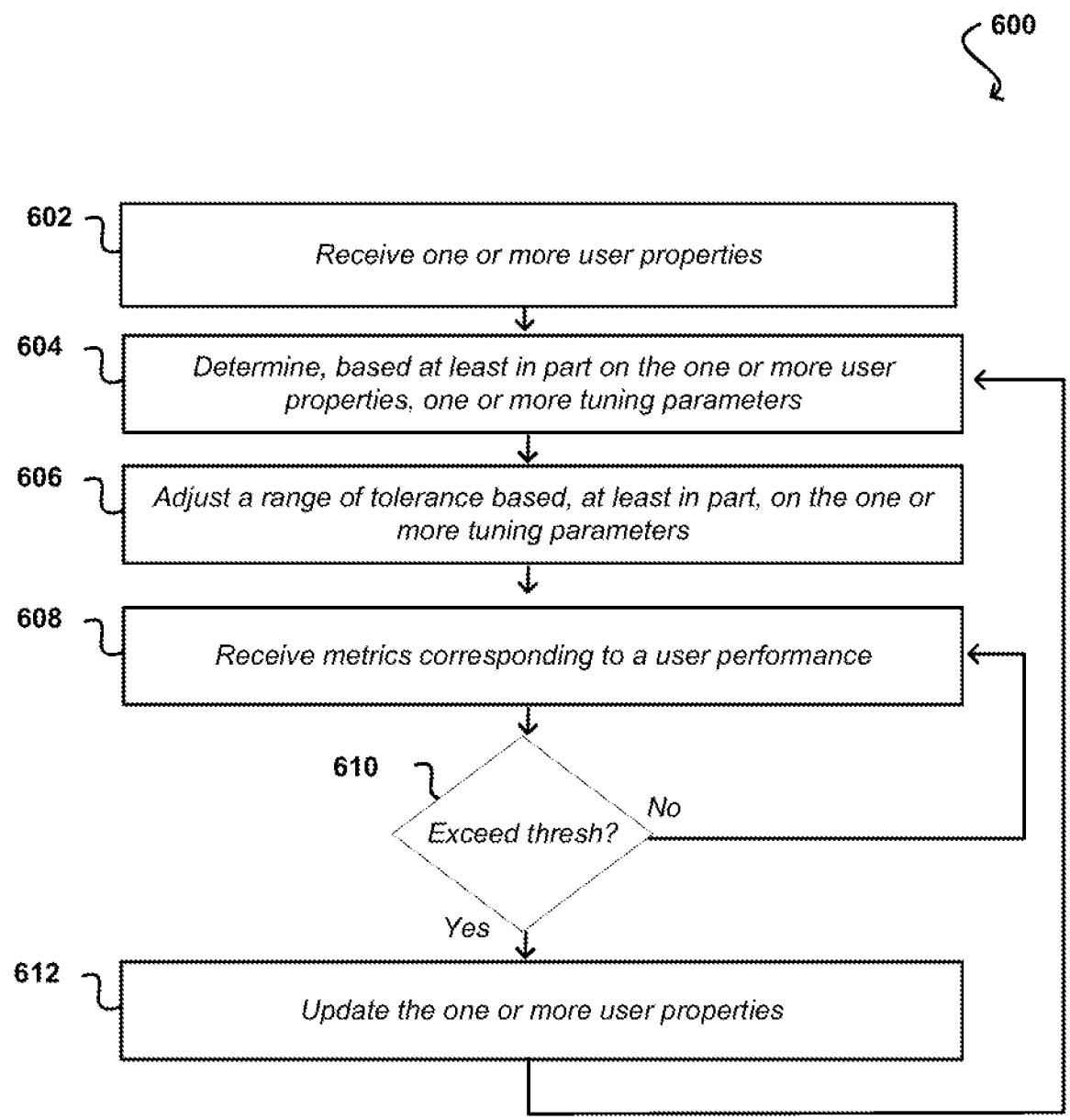
FIG. 6 illustrates an example flow chart of a process for determining tuning parameters for a language system, according to at least one embodiment.

FIG. 6 illustrates an example process 600 for monitoring a user's progress in a learning system. In this example, one or more user properties are received 602. A user property may correspond to demographic information (e.g., user's age, user's race, user's ethnicity, etc.). Furthermore, additional user properties may correspond to the user's language capabilities, such as a native language, a perceived level of competency regarding a target language, and other information. In various embodiments, this information may be stored locally on a user device and utilized to tune or otherwise adjust specific personal parameters of a user's experience with a language learning system. In certain embodiments, information may be anonymized and encrypted and may be provided to adjust an overall or global language model.

The one or more user properties may be used to determine one or more tuning parameters 604. For example, a user that self-identifies as being moderately skilled speaking a language may have different tuning parameters than a novice user. Additionally, a user that identifies a native language that is linguistically more similar to a target language may also have different tuning parameters than another user with a native language linguistically less similar to the target language. These tuning parameters may be provided to one or more language learning systems, which may include one or more trained machine learning systems, such as an SNN, to adjust a range of tolerance 606. For example, the range of tolerance may correspond to a range in which a word or phrase is still identifiable or perceptible when spoken, even if one or more phonemes forming the word or phrase are improperly pronounced or enunciated.

In various embodiments, a user may interact with a learning system and, over time, metrics may be collected corresponding to user performance 608. These metrics may include information such as a percentage of words correctly pronounced, a percentage of words correctly identified as being incorrect, a percentage of misspelled words identified, and the like. Additionally, in one or more embodiments, metrics can be associated with a range of users that utilize the product. For example, a user may be provided with information to indicate that they are within a certain percentage (e.g., a top 5%) of a particular language, a particular language with a certain native language, within a particular region, or the like. These metrics may be compared to one or more thresholds to determine whether the user has advanced or otherwise improved their skills 610. If the metrics do not exceed the threshold, metrics may be continued to be received and evaluated. If the metrics do exceed the threshold, the one or more user properties may be updated 612, which may lead to further refinements of the tuning parameters and/or the range of tolerance. In this manner, the user may receive more complex or more stringent evaluation as their skills improve.

Data Center

Figure 7:
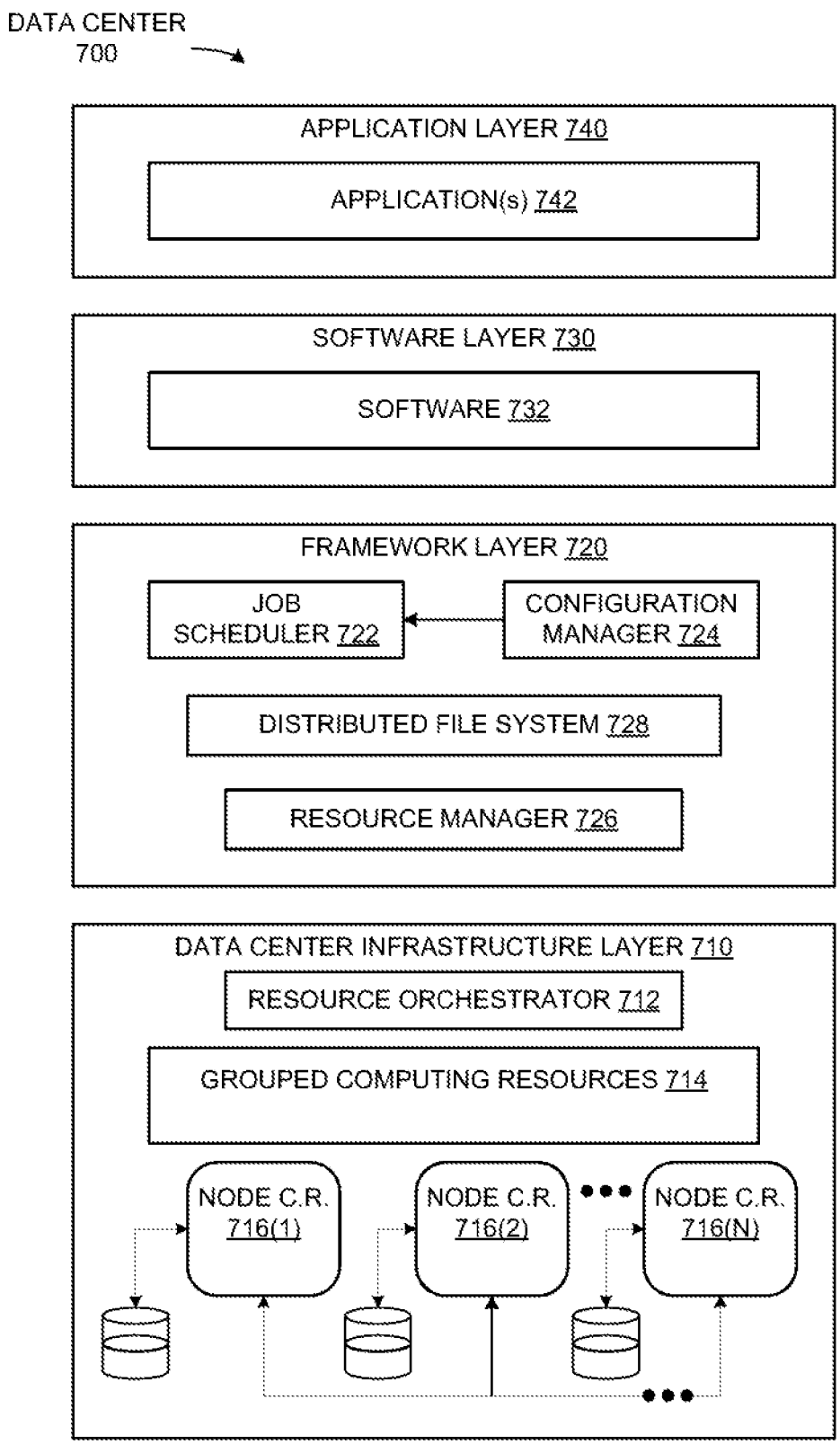
FIG. 7 illustrates an example data center system, according to at least one embodiment.

FIG. 7 illustrates an example data center 700, in which at least one embodiment may be used. In at least one embodiment, data center 700 includes a data center infrastructure layer 710, a framework layer 720, a software layer 730, and an application layer 740.

In at least one embodiment, as shown in FIG. 7, data center infrastructure layer 710 may include a resource orchestrator 712, grouped computing resources 714, and node computing resources ("node C.R.s") 716(1)-716(N), where "N" represents any whole, positive integer. In at least one embodiment, node C.R.s 716(1)-716(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 716(1)-716(N) may be a server having one or more of above-mentioned computing resources.

In at least one embodiment, grouped computing resources 714 may include separate groupings of node C.R.s housed within one or more racks (not shown), or many racks housed in data centers at various geographical locations (also not shown). Separate groupings of node C.R.s within grouped computing resources 714 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 712 may configure or otherwise control one or more node C.R.s 716(1)-716(N) and/or grouped computing resources 714. In at least one embodiment, resource orchestrator 712 may include a software design infrastructure ("SDI") management entity for data center 700. In at least one embodiment, resource orchestrator may include hardware, software or some combination thereof.

In at least one embodiment, as shown in FIG. 7, framework layer 720 includes a job scheduler 722, a configuration manager 724, a resource manager 726 and a distributed file system 728. In at least one embodiment, framework layer 720 may include a framework to support software 732 of software layer 730 and/or one or more application(s) 742 of application layer 740. In at least one embodiment, software 732 or application(s) 742 may respectively include web-based service software or applications, such as those provided by Amazon Web Services, Google Cloud and Microsoft Azure. In at least one embodiment, framework layer 720 may be, but is not limited to, a type of free and open-source software web application framework such as Apache Spark™ (hereinafter "Spark") that may utilize distributed file system 728 for large-scale data processing (e.g., "big data"). In at least one embodiment, job scheduler 722 may include a Spark driver to facilitate scheduling of workloads supported by various layers of data center 700. In at least one embodiment, configuration manager 724 may be capable of configuring different layers such as software layer 730 and framework layer 720 including Spark and distributed file system 728 for supporting large-scale data processing. In at least one embodiment, resource manager 726 may be capable of managing clustered or grouped computing resources mapped to or allocated for support of distributed file system 728 and job scheduler 722. In at least one embodiment, clustered or grouped computing resources may include grouped computing resource 714 at data center infrastructure layer 710. In at least one embodiment, resource manager 726 may coordinate with resource orchestrator 712 to manage these mapped or allocated computing resources.

In at least one embodiment, software 732 included in software layer 730 may include software used by at least portions of node C.R.s 716(1)-716(N), grouped computing resources 714, and/or distributed file system 728 of framework layer 720. The one or more types of software may include, but are not limited to, Internet web page search software, e-mail virus scan software, database software, and streaming video content software.

In at least one embodiment, application(s) 742 included in application layer 740 may include one or more types of applications used by at least portions of node C.R.s 716(1)-716(N), grouped computing resources 714, and/or distributed file system 728 of framework layer 720. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 724, resource manager 726, and resource orchestrator 712 may implement any number and type of self-modifying actions based on any amount and type of data acquired in any technically feasible fashion. In at least one embodiment, self-modifying actions may relieve a data center operator of data center 700 from making possibly bad configuration decisions and possibly avoiding underutilized and/or poor performing portions of a data center.

In at least one embodiment, data center 700 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 700. In at least one embodiment, trained machine learning models corresponding to one or more neural networks may be used to infer or predict information using resources described above with respect to data center 700 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Such components can be used for storing and retrieving information in interaction environments.

Computer Systems

Figure 8:
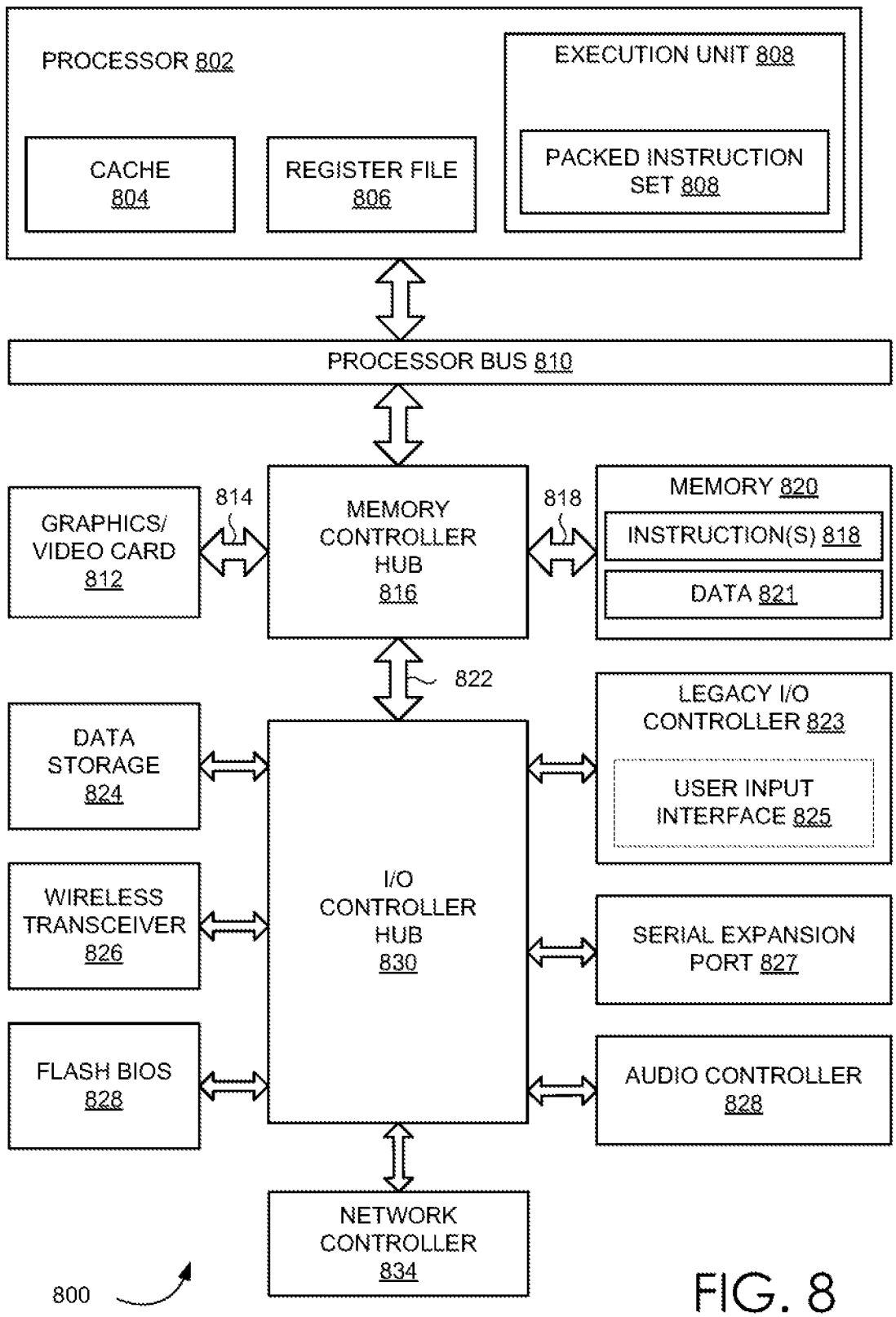
FIG. 8 illustrates a computer system, according to at least one embodiment.

FIG. 8 is a block diagram illustrating an exemplary computer system, which may be a system with interconnected devices and components, a system-on-a-chip (SOC) or some combination thereof 800 formed with a processor that may include execution units to execute an instruction, according to at least one embodiment. In at least one embodiment, computer system 800 may include, without limitation, a component, such as a processor 802 to employ execution units including logic to perform algorithms for process data, in accordance with present disclosure, such as in embodiment described herein. In at least one embodiment, computer system 800 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 800 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), edge computing devices, set-top boxes, network hubs, wide area network ("WAN") switches, or any other system that may perform one or more instructions in accordance with at least one embodiment.

In at least one embodiment, computer system 800 may include, without limitation, processor 802 that may include, without limitation, one or more execution units 808 to perform machine learning model training and/or inferencing according to techniques described herein. In at least one embodiment, computer system 800 is a single processor desktop or server system, but in another embodiment computer system 800 may be a multiprocessor system. In at least one embodiment, processor 802 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 802 may be coupled to a processor bus 810 that may transmit data signals between processor 802 and other components in computer system 800.

In at least one embodiment, processor 802 may include, without limitation, a Level 1 ("L1") internal cache memory ("cache") 804. In at least one embodiment, processor 802 may have a single internal cache or multiple levels of internal cache. In at least one embodiment, cache memory may reside external to processor 802. Other embodiments may also include a combination of both internal and external caches depending on particular implementation and needs. In at least one embodiment, register file 806 may store different types of data in various registers including, without limitation, integer registers, floating point registers, status registers, and instruction pointer register.

In at least one embodiment, execution unit 808, including, without limitation, logic to perform integer and floating point operations, also resides in processor 802. In at least one embodiment, processor 802 may also include a microcode ("ucode") read only memory ("ROM") that stores microcode for certain macro instructions. In at least one embodiment, execution unit 808 may include logic to handle a packed instruction set 809. In at least one embodiment, by including packed instruction set 809 in an instruction set of a general-purpose processor 802, along with associated circuitry to execute instructions, operations used by many multimedia applications may be performed using packed data in a general-purpose processor 802. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 808 may also be used in microcontrollers, embedded processors, graphics devices, DSPs, and other types of logic circuits. In at least one embodiment, computer system 800 may include, without limitation, a memory 820. In at least one embodiment, memory 820 may be implemented as a Dynamic Random Access Memory ("DRAM") device, a Static Random Access Memory ("SRAM") device, flash memory device, or other memory device. In at least one embodiment, memory 820 may store instruction(s) 819 and/or data 821 represented by data signals that may be executed by processor 802.

In at least one embodiment, system logic chip may be coupled to processor bus 810 and memory 820. In at least one embodiment, system logic chip may include, without limitation, a memory controller hub ("MCH") 816, and processor 802 may communicate with MCH 816 via processor bus 810. In at least one embodiment, MCH 816 may provide a high bandwidth memory path 818 to memory 820 for instruction and data storage and for storage of graphics commands, data and textures. In at least one embodiment, MCH 816 may direct data signals between processor 802, memory 820, and other components in computer system 800 and to bridge data signals between processor bus 810, memory 820, and a system I/O 822. In at least one embodiment, system logic chip may provide a graphics port for coupling to a graphics controller. In at least one embodiment, MCH 816 may be coupled to memory 820 through a high bandwidth memory path 818 and graphics/video card 812 may be coupled to MCH 816 through an Accelerated Graphics Port ("AGP") interconnect 814.

In at least one embodiment, computer system 800 may use system I/O 822 that is a proprietary hub interface bus to couple MCH 816 to I/O controller hub ("ICH") 830. In at least one embodiment, ICH 830 may provide direct connections to some I/O devices via a local I/O bus. In at least one embodiment, local I/O bus may include, without limitation, a high-speed I/O bus for connecting peripherals to memory 820, chipset, and processor 802. Examples may include, without limitation, an audio controller 829, a firmware hub ("flash BIOS") 828, a wireless transceiver 826, a data storage 824, a legacy I/O controller 823 containing user input and keyboard interfaces 825, a serial expansion port 827, such as Universal Serial Bus ("USB"), and a network controller 834. Data storage 824 may comprise a hard disk drive, a floppy disk drive, a CD-ROM device, a flash memory device, or other mass storage device.

In at least one embodiment, FIG. 8 illustrates a system, which includes interconnected hardware devices or "chips", whereas in other embodiments, FIG. 8 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 800 are interconnected using compute express link (CXL) interconnects.

Such components can be used for storing and retrieving information in interaction environments.

Figure 9:
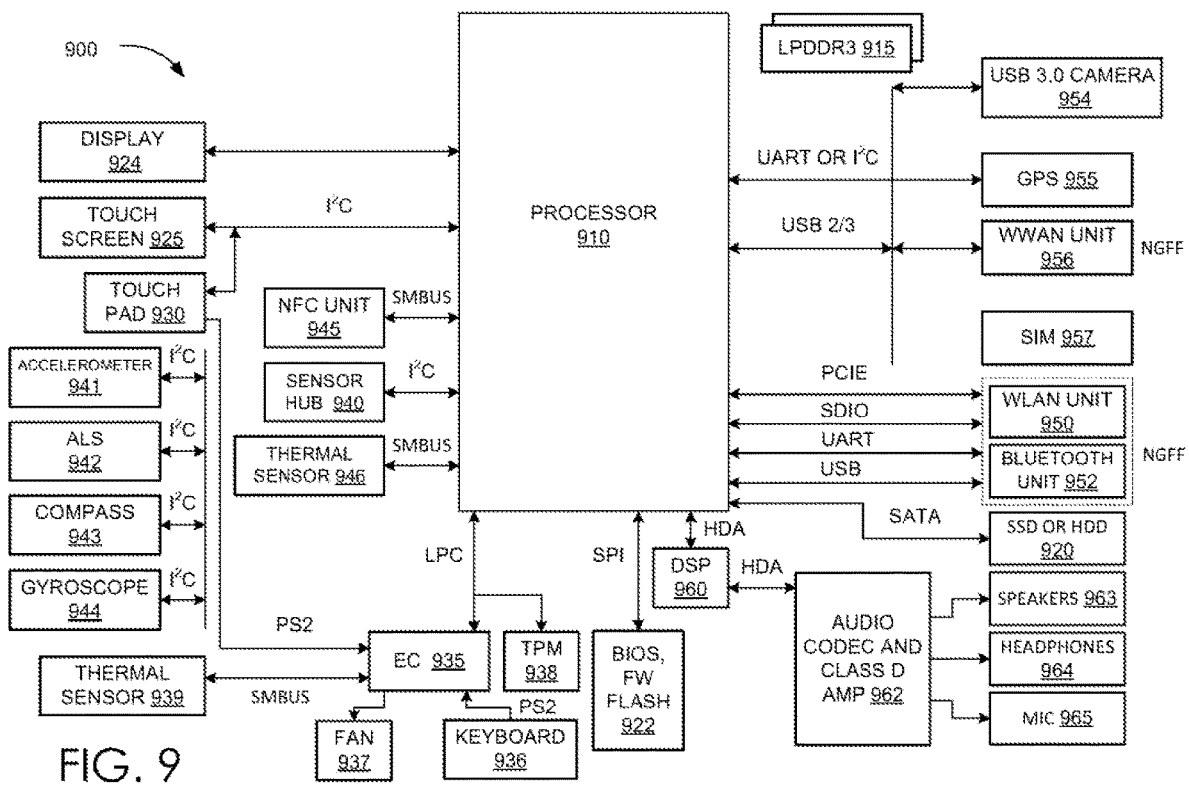
FIG. 9 illustrates a computer system, according to at least one embodiment.

FIG. 9 is a block diagram illustrating an electronic device 900 for utilizing a processor 910, according to at least one embodiment. In at least one embodiment, electronic device 900 may be, for example and without limitation, a notebook, a tower server, a rack server, a blade server, a laptop, a desktop, a tablet, a mobile device, a phone, an embedded computer, or any other suitable electronic device.

In at least one embodiment, system 900 may include, without limitation, processor 910 communicatively coupled to any suitable number or kind of components, peripherals, modules, or devices. In at least one embodiment, processor 910 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices illustrated in FIG. 9 may be interconnected with proprietary interconnects, standardized interconnects (e.g., PCIe) or some combination thereof. In at least one embodiment, one or more components of FIG. 9 are interconnected using compute express link (CXL) interconnects.

In at least one embodiment, FIG. 9 may include a display 924, a touch screen 925, a touch pad 930, a Near Field Communications unit ("NFC") 945, a sensor hub 940, a thermal sensor 946, an Express Chipset ("EC") 935, a Trusted Platform Module ("TPM") 938, BIOS/firmware/flash memory ("BIOS, FW Flash") 922, a DSP 960, a drive 920 such as a Solid State Disk ("SSD") or a Hard Disk Drive ("HDD"), a wireless local area network unit ("WLAN") 950, a Bluetooth unit 952, a Wireless Wide Area Network unit ("WWAN") 956, a Global Positioning System (GPS) 955, a camera ("USB 3.0 camera") 954 such as a USB 3.0 camera, and/or a Low Power Double Data Rate ("LPDDR") memory unit ("LPDDR3") 915 implemented in, for example, LPDDR3 standard. These components may each be implemented in any suitable manner.

In at least one embodiment, other components may be communicatively coupled to processor 910 through components discussed above. In at least one embodiment, an accelerometer 941, Ambient Light Sensor ("ALS") 942, compass 943, and a gyroscope 944 may be communicatively coupled to sensor hub 940. In at least one embodiment, thermal sensor 939, a fan 937, a keyboard 946, and a touch pad 930 may be communicatively coupled to EC 935. In at least one embodiment, speaker 963, headphones 964, and microphone ("mic") 965 may be communicatively coupled to an audio unit ("audio codec and class d amp") 962, which may in turn be communicatively coupled to DSP 960. In at least one embodiment, audio unit 964 may include, for example and without limitation, an audio coder/decoder ("codec") and a class D amplifier. In at least one embodiment, SIM card ("SIM") 957 may be communicatively coupled to WWAN unit 956. In at least one embodiment, components such as WLAN unit 950 and Bluetooth unit 952, as well as WWAN unit 956 may be implemented in a Next Generation Form Factor ("NGFF").

Such components can be used for storing and retrieving information in interaction environments.

Figure 10:
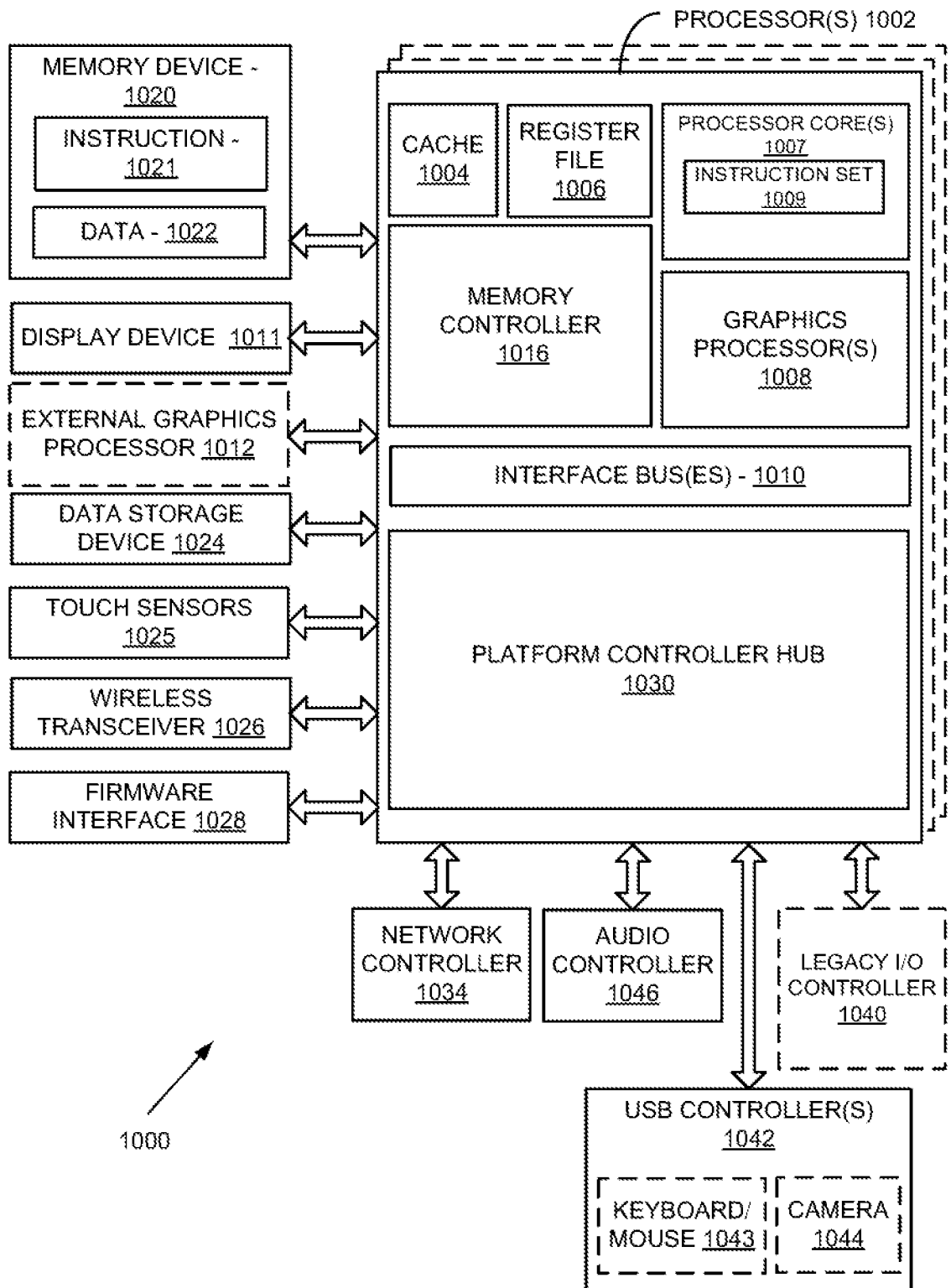
FIG. 10 illustrates at least portions of a graphics processor, according to one or more embodiments.

FIG. 10 is a block diagram of a processing system, according to at least one embodiment. In at least one embodiment, system 1000 includes one or more processors 1002 and one or more graphics processors 1008, and may be a single processor desktop system, a multiprocessor workstation system, or a server system or datacenter having a large number of collectively or separably managed processors 1002 or processor cores 1007. In at least one embodiment, system 1000 is a processing platform incorporated within a system-on-a-chip (SoC) integrated circuit for use in mobile, handheld, or embedded devices.

In at least one embodiment, system 1000 can include, or be incorporated within a server-based gaming platform, a cloud computing host platform, a virtualized computing platform, a game console, including a game and media console, a mobile gaming console, a handheld game console, or an online game console. In at least one embodiment, system 1000 is a mobile phone, smart phone, tablet computing device or mobile Internet device. In at least one embodiment, processing system 1000 can also include, couple with, or be integrated within a wearable device, such as a smart watch wearable device, smart eyewear device, augmented reality device, edge device, Internet of Things ("IoT") device, or virtual reality device. In at least one embodiment, processing system 1000 is a television or set top box device having one or more processors 1002 and a graphical interface generated by one or more graphics processors 1008.

In at least one embodiment, one or more processors 1002 each include one or more processor cores 1007 to process instructions which, when executed, perform operations for system and user software. In at least one embodiment, each of one or more processor cores 1007 is configured to process a specific instruction set 1009. In at least one embodiment, instruction set 1009 may facilitate Complex Instruction Set Computing (CISC), Reduced Instruction Set Computing (RISC), or computing via a Very Long Instruction Word (VLIW). In at least one embodiment, processor cores 1007 may each process a different instruction set 1009, which may include instructions to facilitate emulation of other instruction sets. In at least one embodiment, processor core 1007 may also include other processing devices, such a Digital Signal Processor (DSP).

In at least one embodiment, processor 1002 includes cache memory 1004. In at least one embodiment, processor 1002 can have a single internal cache or multiple levels of internal cache. In at least one embodiment, cache memory is shared among various components of processor 1002. In at least one embodiment, processor 1002 also uses an external cache (e.g., a Level-3 (L3) cache or Last Level Cache (LLC)) (not shown), which may be shared among processor cores 1007 using known cache coherency techniques. In at least one embodiment, register file 1006 is additionally included in processor 1002 which may include different types of registers for storing different types of data (e.g., integer registers, floating point registers, status registers, and an instruction pointer register). In at least one embodiment, register file 1006 may include general-purpose registers or other registers.

In at least one embodiment, one or more processor(s) 1002 are coupled with one or more interface bus(es) 1010 to transmit communication signals such as address, data, or control signals between processor 1002 and other components in system 1000. In at least one embodiment, interface bus 1010, in one embodiment, can be a processor bus, such as a version of a Direct Media Interface (DMI) bus. In at least one embodiment, interface 1010 is not limited to a DMI bus, and may include one or more Peripheral Component Interconnect buses (e.g., PCI, PCI Express), memory busses, or other types of interface busses. In at least one embodiment processor(s) 1002 include an integrated memory controller 1016 and a platform controller hub 1030. In at least one embodiment, memory controller 1016 facilitates communication between a memory device and other components of system 1000, while platform controller hub (PCH) 1030 provides connections to I/O devices via a local I/O bus.

In at least one embodiment, memory device 1020 can be a dynamic random access memory (DRAM) device, a static random access memory (SRAM) device, flash memory device, phase-change memory device, or some other memory device having suitable performance to serve as process memory. In at least one embodiment memory device 1020 can operate as system memory for system 1000, to store data 1022 and instructions 1021 for use when one or more processors 1002 executes an application or process. In at least one embodiment, memory controller 1016 also couples with an optional external graphics processor 1012, which may communicate with one or more graphics processors 1008 in processors 1002 to perform graphics and media operations. In at least one embodiment, a display device 1011 can connect to processor(s) 1002. In at least one embodiment display device 1011 can include one or more of an internal display device, as in a mobile electronic device or a laptop device or an external display device attached via a display interface (e.g., DisplayPort, etc.). In at least one embodiment, display device 1011 can include a head mounted display (HMD) such as a stereoscopic display device for use in virtual reality (VR) applications or augmented reality (AR) applications.

In at least one embodiment, platform controller hub 1030 enables peripherals to connect to memory device 1020 and processor 1002 via a high-speed I/O bus. In at least one embodiment, I/O peripherals include, but are not limited to, an audio controller 1046, a network controller 1034, a firmware interface 1028, a wireless transceiver 1026, touch sensors 1025, a data storage device 1024 (e.g., hard disk drive, flash memory, etc.). In at least one embodiment, data storage device 1024 can connect via a storage interface (e.g., SATA) or via a peripheral bus, such as a Peripheral Component Interconnect bus (e.g., PCI, PCI Express). In at least one embodiment, touch sensors 1025 can include touch screen sensors, pressure sensors, or fingerprint sensors. In at least one embodiment, wireless transceiver 1026 can be a Wi-Fi transceiver, a Bluetooth transceiver, or a mobile network transceiver such as a 3G, 4G, or Long Term Evolution (LTE) transceiver. In at least one embodiment, firmware interface 1028 enables communication with system firmware, and can be, for example, a unified extensible firmware interface (UEFI). In at least one embodiment, network controller 1034 can enable a network connection to a wired network. In at least one embodiment, a high-performance network controller (not shown) couples with interface bus 1010. In at least one embodiment, audio controller 1046 is a multi-channel high definition audio controller. In at least one embodiment, system 1000 includes an optional legacy I/O controller 1040 for coupling legacy (e.g., Personal System 2 (PS/2)) devices to system. In at least one embodiment, platform controller hub 1030 can also connect to one or more Universal Serial Bus (USB) controllers 1042 connect input devices, such as keyboard and mouse 1043 combinations, a camera 1044, or other USB input devices.

In at least one embodiment, an instance of memory controller 1016 and platform controller hub 1030 may be integrated into a discreet external graphics processor, such as external graphics processor 1012. In at least one embodiment, platform controller hub 1030 and/or memory controller 1016 may be external to one or more processor(s) 1002. For example, in at least one embodiment, system 1000 can include an external memory controller 1016 and platform controller hub 1030, which may be configured as a memory controller hub and peripheral controller hub within a system chipset that is in communication with processor(s) 1002.

Such components can be used for storing and retrieving information in interaction environments.

Figure 11:
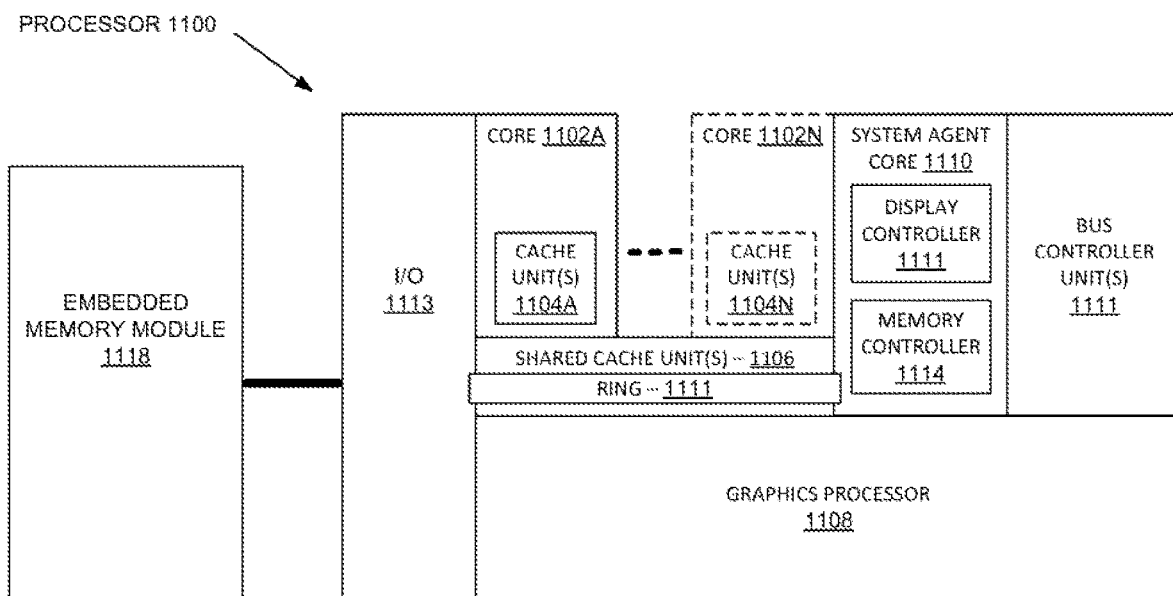
FIG. 11 illustrates at least portions of a graphics processor, according to one or more embodiments.

FIG. 11 is a block diagram of a processor 1100 having one or more processor cores 1102A-1102N, an integrated memory controller 1114, and an integrated graphics processor 1108, according to at least one embodiment. In at least one embodiment, processor 1100 can include additional cores up to and including additional core 1102N represented by dashed lined boxes. In at least one embodiment, each of processor cores 1102A-1102N includes one or more internal cache units 1104A-1104N. In at least one embodiment, each processor core also has access to one or more shared cached units 1106.

In at least one embodiment, internal cache units 1104A-1104N and shared cache units 1106 represent a cache memory hierarchy within processor 1100. In at least one embodiment, cache memory units 1104A-1104N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1106 and 1104A-1104N.

In at least one embodiment, processor 1100 may also include a set of one or more bus controller units 1116 and a system agent core 1110. In at least one embodiment, one or more bus controller units 1116 manage a set of peripheral buses, such as one or more PCI or PCI express busses. In at least one embodiment, system agent core 1110 provides management functionality for various processor components. In at least one embodiment, system agent core 1110 includes one or more integrated memory controllers 1114 to manage access to various external memory devices (not shown).

In at least one embodiment, one or more of processor cores 1102A-1102N include support for simultaneous multi-threading. In at least one embodiment, system agent core 1110 includes components for coordinating and operating cores 1102A-1102N during multi-threaded processing. In at least one embodiment, system agent core 1110 may additionally include a power control unit (PCU), which includes logic and components to regulate one or more power states of processor cores 1102A-1102N and graphics processor 1108.

In at least one embodiment, processor 1100 additionally includes graphics processor 1108 to execute graphics processing operations. In at least one embodiment, graphics processor 1108 couples with shared cache units 1106, and system agent core 1110, including one or more integrated memory controllers 1114. In at least one embodiment, system agent core 1110 also includes a display controller 1111 to drive graphics processor output to one or more coupled displays. In at least one embodiment, display controller 1111 may also be a separate module coupled with graphics processor 1108 via at least one interconnect, or may be integrated within graphics processor 1108.

In at least one embodiment, a ring based interconnect unit 1112 is used to couple internal components of processor 1100. In at least one embodiment, an alternative interconnect unit may be used, such as a point-to-point interconnect, a switched interconnect, or other techniques. In at least one embodiment, graphics processor 1108 couples with ring interconnect 1112 via an I/O link 1113.

In at least one embodiment, I/O link 1113 represents at least one of multiple varieties of I/O interconnects, including an on package I/O interconnect which facilitates communication between various processor components and a high-performance embedded memory module 1118, such as an eDRAM module. In at least one embodiment, each of processor cores 1102A-1102N and graphics processor 1108 use embedded memory modules 1118 as a shared Last Level Cache.

In at least one embodiment, processor cores 1102A-1102N are homogenous cores executing a common instruction set architecture. In at least one embodiment, processor cores 1102A-1102N are heterogeneous in terms of instruction set architecture (ISA), where one or more of processor cores 1102A-1102N execute a common instruction set, while one or more other cores of processor cores 1102A-1102N executes a subset of a common instruction set or a different instruction set. In at least one embodiment, processor cores 1102A-1102N are heterogeneous in terms of microarchitecture, where one or more cores having a relatively higher power consumption couple with one or more power cores having a lower power consumption. In at least one embodiment, processor 1100 can be implemented on one or more chips or as an SoC integrated circuit.

Such components can be used for storing and retrieving information in interaction environments.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be any processor capable of general purpose processing such as a CPU, GPU, or DPU. As non-limiting examples, "processor" may be any microcontroller or dedicated processing unit such as a DSP, image signal processor ("ISP"), arithmetic logic unit ("ALU"), vision processing unit ("VPU"), tree traversal unit ("TTU"), ray tracing core, tensor tracing core, tensor processing unit ("TPU"), embedded control unit ("ECU"), and the like. As non-limiting examples, "processor" may be a hardware accelerator, such as a PVA (programmable vision accelerator), DLA (deep learning accelerator), etc. As non-limiting examples, "processor" may also include one or more virtual instances of a CPU, GPU, etc., hosted on an underlying hardware component executing one or more virtual machines. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   receiving an auditory input including at least one phoneme forming at least a portion of a word;
   determining, using a trained machine learning system, a similarity between the at least one phoneme and a target word;
   obtaining one or more properties of a user providing the auditory input;
   determining, based at least in part on the one or more properties, one or more tuning parameters;
   determining the similarity is within a range of tolerance, the range of tolerance being tunable based at least on the one or more properties; and
   providing confirmation of the at least one phoneme.

2. The computer-implemented method of claim 1, wherein the trained machine learning system includes at least a Siamese neural network.

3. The computer-implemented method of claim 1, further comprising:
   adjusting the range of tolerance based, at least in part, on the one or more tuning parameters.

4. The computer-implemented method of claim 1, wherein the one or more properties include at least one of a user native language, a user language competence, a user age, a user education level, or a user performance level.

5. The computer-implemented method of claim 1, further comprising:
   determining, based at least in part on a first user score, a first user performance level, the first user score associated with a first time period;
   determining, based at least in part on a second user score, a second user performance level, the second user score associated with a second time period, later than the first time period; and
   determining a change in user performance level based at least in part on the first user performance level and the second user performance level.

6. The computer-implemented method of claim 1, further comprising:
   storing the auditory input and the similarity; and
   updating one or more parameters of the trained machine learning system using, at least in part, the auditory input and the similarity.

7. The computer-implemented method of claim 1, wherein data used to adjust one or more tuning parameters, including the range of tolerance, is locally stored on the user device.

8. The computer-implemented method of claim 1, wherein the range of tolerance corresponds to a learned distance metric between the at least one phoneme and at least one of the target word or the target phoneme.

9. A method, comprising:
   generating one or more warped words based, at least in part, on a ground truth word, the one or more warped words including at least one of a misspelling or a mispronunciation of the ground truth word;
   generating for each of the one or more warped words and the ground truth word, respective audio and text samples;
   training, using at least the respective audio and text samples, a machine learning system;
   generating one or more embeddings for the ground truth word and the one or more warped words; and
   determining, based at least in part on the one or more embeddings, a range of tolerance.

10. The method of claim 9, wherein the machine learning system includes at least a Siamese neural network.

11. The method of claim 9, wherein the respective audio samples are produced using a text to speech system.

12. The method of claim 9, further comprising:
    modifying the range of tolerance based, at least in part, on one or more tuning parameters.

13. The method of claim 12, wherein the one or more tuning parameters are based, at least in part, on one or more user properties.

14. A computer-implemented method, comprising:
    providing an interface for a language learning system to a user, the interface to prompt the user to perform one or more actions;
    receiving, responsive to a first prompt, an auditory input from the user, the auditory input corresponding to an utterance associated with a target word;
    determining the utterance is within a range of tolerance for the target word, the range of tolerance corresponding to a learned distance metric associated with a perceptibility of the target word, wherein the range of tolerance is based, at least in part, on a user competency level; and
    providing, via the interface, a notification of the utterance being within the range of tolerance.

15. The computer-implemented method of claim 14, further comprising:
    receiving, responsive to a second prompt, a user input, the second prompt presenting at least one of a word spelling or an auditory word pronunciation;
    determining the user input corresponds to a correct answer associated with the second prompt; and
    providing, via the interface, a second notification of the user input being the correct answer.

16. The computer-implemented method of claim 14, wherein the learned distance metric is generated using at least one of triplet loss or contrastive loss.

17. The computer-implemented method of claim 14, further comprising:
    determining a first competency level for the user;
    collecting performance metrics for the user;
    determining a second competency level for the user; and
    adjusting the range of tolerance based, at least in part, on the second competency level.

* * * * *